Nov. 9, 1965 BIN-LUN HO 3,217,170

ROTARY OPTICAL SERVOMECHANISM

Filed Dec. 31, 1962

INVENTOR.
BIN-LUN HO

BY John L. Jackson

ATTORNEY

United States Patent Office 3,217,170

Patented Nov. 9, 1965

3,217,170

ROTARY OPTICAL SERVOMECHANISM

Bin-Lun Ho, San Jose, Calif., assignor to International Business Machines Corporation, New York, N.Y., a corporation of New York Filed Dec. 31, 1962, Ser. No. 248,376
7 Claims. (Cl. 250—230)

This invention relates to servomechanisms in general and more particularly to a rotary servomechanism employing optical sensors for velocity, position and direction control.

Many new servomechanism applications have arisen with the recent advent of "automation." However, the actual number of new servomechanism applications has been limited by the high cost of the servomechanisms themselves. Thus, in borderline cases, the choice often has been to perform the function either manually or semi-automatically rather than to fully automate through use of a servomechanism.

The prime reason for the relative high cost of any servomechanism lies in its complexity. Thus, in conventional systems expensive electronic circuitry such as error input amplifiers, velocity input amplifiers, summing amplifiers, phase detectors, difference amplifiers, etc. are used. This complexity leads not only to a high cost for originally producing the system, but, additionally, leads to higher maintenance costs. In an effort to reduce the cost of servomechanisms in both terms of original as well as maintenance costs, fairly recently several less complex servomechanism systems have evolved. Certain shortcomings, however, are attendant to the use of these lesser cost, simplified servomechanisms. For instance, in one such low cost servomechanism system, the direction control circuitry has been done away with such that the servomechanism moves only in one direction. As is obvious, in rotary servomechanism applications, the speed or response time of the system suffers greatly since the servomotor may have to rotate through almost a 360° path prior to reaching the new or selected position. In many applications this relatively slow response time cannot be tolerated.

Other attempts to provide a relatively simple, low cost servomechanism have resulted in the so-called "bang-bang" servomechanism. Basically, a bang-bang servomechanism is a positional control system wherein the driving arrangement is operated at maximum power until the switching point between the initial and selected position is reached and at maximum reverse power from the switching point to the selected position. Theoretically, such a system will provide an optimum drive between positions with minimum oscillation about the selected position since the equal but opposite driving forces provide that zero velocity is reached at the selected position. A bang-bang control system is realized by replacing the amplifying control arrangement of a conventional system with a bi-directional switching arrangement which provides an output signal of constant amplitude. The switching arrangement operates the driving arrangement at maximum power in a first direction in response to an input signal of one polarity and at maximum power in the opposite direction in response to an input signal of opposite polarity. A bang-bang control system is generally simple and of rugged construction and is ideally suited for use in situations where three states or conditions are necessary; for example, the bang-bang control system may be used to control the rudders on a missile or the like where "left full rudders," "right full rudder," and "center rudder" are desired control positions.

Bang-bang control systems, however, have been limited in application because of certain inherent operational difficulties. Thus, where rapid response is necessary or where distances between positions vary, it is extremely difficult to determine the switching point at which the energization of the drive mechanism must be reversed. If the drive is not switched at the correct switching point, the system will not reach exact zero velocity at the selected position and will therefore oscillate thereabout since acceleration in the wrong direction will be applied for any error.

It is therefore an object of the present invention to provide a simple, relatively inexpensive rotary servomechanism.

Another object of the present invention is to provide a servomechanism wherein optical sensors are utilized to provide velocity, position and null information.

Another object of the present invention is to provide an optical servomechanism which while being relatively simple and inexpensive, moves to any selected position through the shortest possible path of rotation.

Another object of the present invention is to provide an optical servomechanism of the bang-bang type for use in applications where positions vary which determines the exact switching point between selected and initial positions.

Other and further objects and advantages of the invention will be apparent from the following more particular description of the preferred embodiment of the invention, as illustrated in the accompanying drawings in which.

Briefly, in the preferred embodiment, the shaft which is to be selectively positioned has mounted thereon a masked parabolic mirror, a null sensing photocell, and a deflectable weighted mirror. Mounted in a stationary position just above these components is a ring of lamps representing angular positions to which the shaft can be rotated, a large lens, and a switching photocell. The null sensing photocell, attached to the parabolic reflector, is connected into the shaft drive motor circuitry and is adapted to switch the motor off when it senses a beam of light and to switch the motor on when no light is sensed. The switching photocell is a direction control device which is also connected to the drive motor circuitry. When the switching photocell receives light, it causes the drive motor to turn in one direction and when it receives no light, it causes the drive motor to turn in the opposite direction. The design of the mask is such that the shaft will always move in the shortest path to a new position and that braking time is advanced proportional to shaft rotational velocity.

Figure 1:
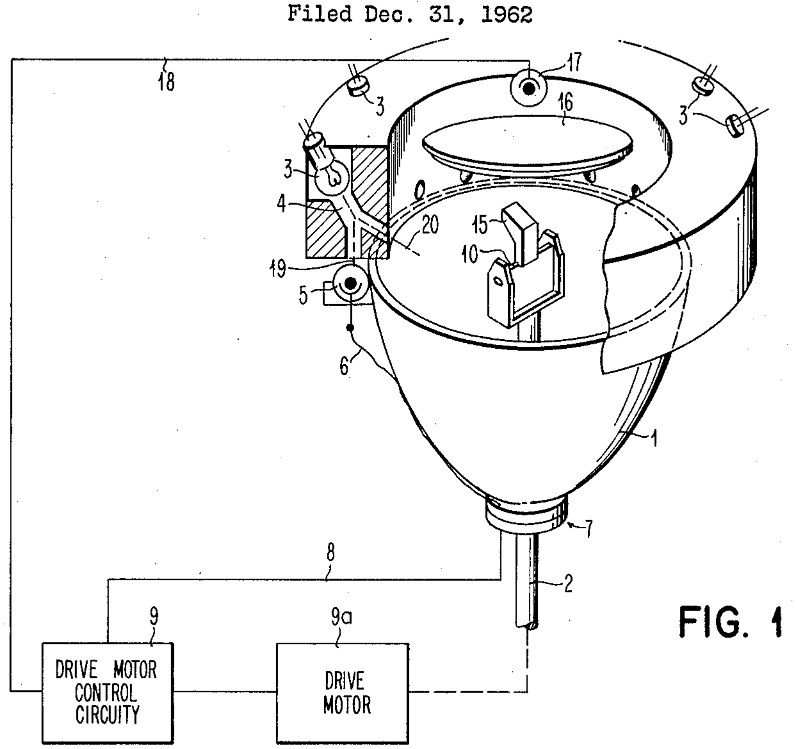
FIG. 1 is an isometric-block representation of the herein described novel servomechanism system.

Refer first to FIG. 1 wherein is shown an isometric-block representation of the hereinafter described novel servomechanism. In FIG. 1 is shown a curved reflector 1 which may be, for instance, a parabolic mirror, mounted on the shaft 2 which is to be positioned. Mounted adjacent to and around the upper edge of the curved reflector is a plurality of lamps 3, one lamp for each position to which the shaft may be rotated. In optical association with each of the lamps 3 is a light channeling device 4 for directing the light from its associated lamp along two paths. Mounted on the masked parabolic reflector is a null sensing photocell 5 which is connected along line 6 to one side of the slip ring 7. The other side of the slip ring 7 is connected along line 8 to the drive motor control circuitry 9.

Figure 2:
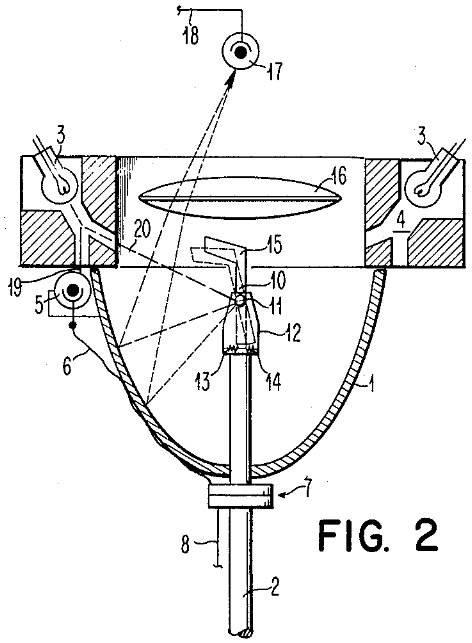
FIG. 2 is a sectional view of the control system of FIG. 1.

Connected to the end of shaft 2 which extends into the center of the masked parabolic reflector 1 is a pivoted, weighted mirror arrangement which is shown in detail in FIG. 2. As shown in FIG. 2, the mirror 10 is pivoted at point 11 which is connected to the extension 12 of shaft 2. Connected to one end of the mirror 10 are two springs 13 and 14 which are in turn connected to the side walls of the shaft 2. Springs 13 and 14 center the mirror 10 with respect to shaft 2 when no rotational forces are acting on the shaft. Connected to the opposite end of mirror 10 is a weight 15 which tends to act against the positioning forces of springs 13 and 14 when rotational velocity is imparted to shaft 2 by the drive motor 9*a*.

Disposed above the masked parabolic reflector 1 is a lens 16 and a switching photocell 17 which is connected along line 18 to the drive motor control circuitry 9. An example of drive motor control circuitry which can be utilized in the subject servo system can be found in U.S. Patent Re. 23,275.

Figure 3:
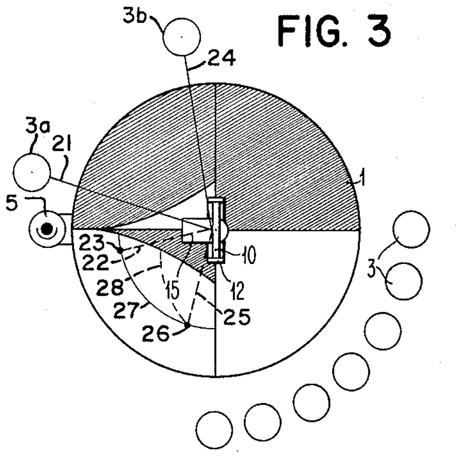
FIG. 3 is a top view of the masked reflector of FIGS. 1 and 2.

FIG. 3 is a top view of the parabolic reflector 1 showing the position of the null sensing photocell 5, the position lamps 3, and the pattern of the mask on the reflector 1. As will hereinafter become more clear from the following detailed operational description, the mask is designed such that the servomechanism will always travel through the shortest path to a new position and, additionally, is designed to provide a velocity sensitiveness such that the switching point of the servomechanism is changed in accordance with velocity.

In operation, the null sensing photocell 5, attached to the curved reflector 1 furnishes a control signal to the shaft drive motor circuitry 9 to switch the motor 9*a* off when it senses a beam of light and to switch the motor 9*a* on when no light is sensed. The switching photocell 17 is a direction control device which also furnishes a control signal to the shaft drive motor circuitry 9. When the switching photocell 17 receives light, it causes the drive motor 9*a* to turn in one direction and when it receives no light, it causes the drive motor to turn in the opposite direction. The direction that the drive motor will rotate responsive to light or lack of light is dependent upon the design of the mask carried by the reflector 1. The interaction between the mask carried by the reflector 1 and the switching photocell 17 will hereinafter be discussed in more detail.

When a new position is to be selected, the lamp for instance 3*a* or 3*b* in FIG. 3 corresponding to this new position is turned on. The light from these lamps 3 is channeled along two paths 19 and 20. Beam 19 is channeled onto null sensing photocell 5 while beam 20 is directed toward the weighted mirror 10. Beam 20 from the new position lamp 3*a* or 3*b* reflects off of the weighted mirror 10 on the end of shaft 2 and onto the parabolic masked reflector 1. Depending upon the angular position of the new position lamp 3*a* or 3*b* relative to the previous position of the masked reflector 1, beam 20 will strike either a polished or a masked portion of the reflector. A polished portion of the reflector 1 will reflect light while the masked portion will absorb light. The design of the masking pattern is such that if the new position lamp is less than 180° in the clockwise direction from the old position lamp, beam 20 will strike a polished part of the reflector and will be reflected onto the switching photocell, commanding the shaft drive motor to rotate in a clockwise direction. The opposite is true when the new position lamp is more than 180° clockwise from the old position lamp. Thus, since the null sensing photocell 5 is no longer sensing light since the old position lamp has been turned off, the shaft drive motor 9*a* is switched on and begins to rotate toward the newly indicated position in the direction, as commanded by the switching photocell 17, which will lead to the smallest angle of shaft rotation.

From a consideration of the mask pattern of FIG. 3, it can be seen that after the shaft 2 has partially completed its rotation toward the new position, a darkened portion of the mask will be rotated into the path of beam 20 cutting off light to the switching photocell 17. This causes the shaft drive motor 9*a* to reverse itself, thereby braking shaft rotation. The mask is designed such that this braking action is applied at just the right time to bring shaft velocity to zero when the new position is reached. Reverse rotation or dither of the shaft 2 will not occur since, when the new position is reached, the null sensing photocell 5 intercepts the first beam emanating from the new position lamp, thereby causing the shaft drive motor 9*a* to be switched off.

Variations in shaft rotation speed are compensated for by the weighted mirror arrangement on the end of shaft 2. This weight causes the motor reversing operation to be advanced in time depending upon the rotation speed of the shaft 2. In FIG. 2 the position of the mirror is shown in bold lines when the new position light is energized and in phantom lines after shaft velocity has increased. Thus, as shaft speed increases, centrifugal force acts upon the mirror weight 15 and tilts the mirror 10, causing beam 20 from the new position lamp to be diverted to a lower portion on the parabolic reflector 1. From a consideration of FIG. 3, it can be seen that the mask is designed to coact with the weighted mirror arrangement such that the shaft drive motor 9*a* is reversed at an earlier time, thus providing the longer braking period which is necessary because of greater shaft speed.

For a more detailed description of the advancement of the reversal of the servomotor in accordance with increased rotational velocity, consider the mask design as shown in FIG. 3. If the new position light 3*a* is energized, light from it will pass along path 21 and be reflected from the face of mirror 10 along path 22 onto the unmasked portion of reflector 1 at point 23. As the reflector 1 and mirror combination is rotated in a clockwise direction, point 23 will move toward the center of the reflector due to tilting of the mirror and toward the masked portion of the reflector due to the change of the angle of incidence of light from lamp 3*a* onto mirror 10. When point 23 moves onto the shaded portion, motor reversal will occur.

Assume now lamp 3*b* is the new position lamp. Light will pass along the path and be reflected from the face of mirror 10 along path 25 to point 26. If the weighted mirror arrangement were not utilized as the reflector 1 is rotated, the change in the angle of incidence would cause point 26 to move along path 27 until it moves onto the masked area. With the weighted mirror arrangement, however, point 26 will move along path 28 and intersect the masked portion to therefore effect motor reversal sooner.

In summary, the shaft 2 which is to be selectively positioned has mounted on one of its ends a masked parabolic reflector 1, a null sensing photocell 5, and a weighted mirror 10. Mounted in the stationary position just above these components are a ring of lamps 3 representing angular positions to which the shaft 2 can be rotated, a large lens 16, and a switching photocell 17. The null sensing photocell 5, attached to the parabolic reflector 1 is connected into the shaft drive motor circuitry 9 and is adapted to switch the motor 9*a* off when it senses a beam of light and to switch the motor on when no light is sensed. The switching photocell 17 is a direction control device which is also connected into the shaft drive motor circuitry 9. When the switching photocell 17 receives light, it causes the drive motor 9 to turn in the clockwise direction and when it receives no light, it causes the drive motor 9*a* to turn in the counter-clockwise direction. The mask on the parabolic reflector is designed such that the drive motor 9*a* is reversed so that zero velocity is reached at the null position. Velocity variations are compensated for by the coaction of the mask design and weighted mirror arrangement 10.

In the above described manner, I have provided a novel, inexpensive rotary optical servomechanism employing optical components and techniques instead of the more expensive conventional electronic techniques to provide velocity, position and null control. Additionally, the herein described novel servomechanism utilizes bang-bang techniques to provide a simple, rugged servomechanism system. While the herein described servomechanism employs simple optical techniques, it does so without sacrifice of speed in that it moves to the desired new position through bi-directional movement rather than the more time consuming unidirectional movement. Additionally, while most conventional bang-bang type servomechanisms suffer in positioning time when the points or positions to be moved to vary such that different velocities are encountered by the servomechanism which results in oscillation about the selected position, the herein described servomechanism provides a novel method of compensating for varying velocities such that the time of switching is varied in accordance with the velocity of the shaft. Thus, not only has a relatively simple rugged bang-bang servomechanism been provided which is useful in conventional bang-bang type applications, but, additionally, the range of bang-bang type servomechanisms has been extended to now include those applications where selected positions vary in distance with a consequent variation in velocity.

While the invention has been particularly shown and described with reference to a preferred embodiment thereof, it will be understood by those skilled in the art that various changes in the form and details may be made therein without departing from the spirit and the scope of the invention.

What is claimed is:

1. A rotary servomechanism sensor system for providing control signals to the drive motor control circuitry of an associated bi-directional servomotor including an output shaft comprising:
- a curved reflector connected to said output shaft,
- first radiant energy responsive means mounted on said curved reflector and electrically connected to said drive motor control circuitry,
- second radiant energy responsive means in optical association with said curved reflector electrically connected to said drive motor control circuitry;
- a plurality of selectively energizable radiant energy sources corresponding to angular positions to which said output shaft can be rotated in optical association with said first and said second radiant energy responsive means and said curved reflector, and
- a mask on said curved reflector of a pattern such that when one of said selectively energizable radiant energy sources is energized the amount of radiant energy reflected onto said second radiant energy responsive means will be indicative of the shortest rotational path to a new output shaft position corresponding to the angular position of the energized radiant energy source.

2. A rotary servomechanism sensor system for providing control signals to the drive motor control circuitry of an associated bi-directional servomotor including an output shaft comprising:
- a curved reflector connected to said output shaft,
- a first photocell mounted on said curved reflector and electrically connected to said drive motor control circuitry,
- a second photocell in optical association with said curved reflector electrically connected to said drive motor control circuitry,
- a plurality of selectively energizable lamps corresponding to angular positions to which said output shaft can be rotated in optical association with said first and said second photocells and said curved reflector, and
- a mask on said curved reflector of a pattern such that when one of said selectively energizable lamps is energized the amount of light reflected onto said second photocell will be indicative of the shortest rotational path to a new output shaft position corresponding to the angular position of the energized lamp.

3. A rotary servomechanism sensor system for providing control signals to the drive motor control circuitry of an associated bi-directional servomotor including an output shaft comprising:
- a curved reflector connected to said output shaft,
- a first photocell mounted on said curved reflector and electrically connected to said drive motor control circuitry,
- a second photocell in optical association with said curved reflector electrically connected to said drive motor control circuitry,
- a plurality of selectively energizable lamps corresponding to angular positions to which said output shaft can be rotated in optical association with said first and said second photocells and said curved reflector, and
- a mask on said curved reflector of a pattern such that when one of said selectively energizable lamps is energized the amount of light reflected onto said second photocell will be indicative of both the shortest rotational path to a new output shaft position corresponding to the angular position of the energized lamp and the time of application of reverse breaking to said output shaft.

4. A rotary servomechanism sensor system for providing control signals to the drive motor control circuitry of an associated bi-directional servomotor including an output shaft comprising:
- a curved reflector connected to said output shaft,
- a null sensing photocell mounted on said curved reflector and electrically connected to said drive motor control circuitry,
- a switching photocell in optical association with said curved reflector electrically connected to said drive motor control circuitry,
- a plurality of selectively energizable lamps corresponding to angular positions to which said output shaft can be rotated in optical association with said null sensing photocell, said switching photocell and said curved reflector,
- a deflectable weighted mirror mounted on said output shaft in optical association with both said curved reflector and said plurality of selectively energizable lamps, and
- a mask on said curved reflector of a pattern such that when one of said selectively energizable lamps is energized the amount of light reflected onto said switching photocell will be indicative of the shortest rotational path to a new output shaft position corresponding to the angular position of the energized lamp.

5. A rotary servomechanism sensor system for providing control signals to the drive motor control circuitry of an associated bi-directional servomotor including an output shaft comprising:
- a curved reflector connected to said output shaft,
- a null sensing photocell mounted on said curved reflector and electrically connected to said drive motor control circuitry,
- a switching photocell in optical association with said curved reflector electrically connected to said drive motor control circuitry,
- a plurality of selectively energizable lamps corresponding to angular positions to which said output shaft can be rotated in optical association with said null sensing photocell, said switching photocell and said curved reflector,
- a deflectable weighted mirror mounted on said output shaft in optical association with both said curved reflector and said plurality of selectively energizable lamps, and
- a mask on said curved reflector of a pattern such that when one of said selectively energizable lamps is energized the amount of light reflected onto said switching photocell will be indicative of both the shortest rotational path to a new output shaft position corresponding to the angular position of the energized lamp and the time of application of reverse breaking to said output shaft.

6. A rotary servomechanism sensor system for providing control signals to the drive motor control circuitry of an associated bi-directional servomotor including an output shaft comprising:

a parabolic reflector connected to said output shaft, a null sensing photocell mounted on said parabolic reflector and electrically connected to said drive motor control circuitry, a switching photocell in optical association with said parabolic reflector electrically connected to said drive motor control circuitry, a plurality of selectively energizable lamps corresponding to angular positions to which said output shaft can be rotated in optical association with said null sensing photocell, said switching photocell and said curved reflector, a deflectable weighted mirror connected to said output shaft in optical association with both said parabolic reflector and said plurality of selectively energizable lamps, and a mask on said parabolic reflector of a pattern such that when one of said selectively energizable lamps is energized the amount of light reflected onto said switching photocell will be indicative of both the shortest rotational path to a new output shaft position corresponding to the angular position of the energized lamp and the time of application of reverse breaking to said output shaft.

7. A rotary servomechanism sensor system for providing control signals to the drive motor control circuitry of an associated bi-directional servomotor including an output shaft comprising:

a parabolic reflector connected to said output shaft, a null sensing photocell mounted on said parabolic reflector and electrically connected to said drive motor control circuitry, a switching photocell in optical association with said parabolic reflector electrically connected to said drive motor control circuitry, a plurality of selectively energizable lamps corresponding to angular positions to which said output shaft can be rotated, light channeling means in optical association with each of said plurality of selectively energizable lamps for channeling the radiant energy from each of said lamps along a first path to said null sensing photocell and along a second path onto said switching photocell via said deflectable weighted mirror and said parabolic reflector, and a mask on said curved reflector of a pattern such that when one of said selectively energizable lamps is energized the amount of radiant energy reflected onto said switching photocell will be indicative of both the shortest rotational path to a new output shaft position corresponding to the angular position of the energized lamp and the time of application of reverse braking of said output shaft.

References Cited by the Examiner

UNITED STATES PATENTS

| | | | |
|---|---|---|---|
| 2,361,973 | 11/44 | Smith | 250—203 X |
| 2,447,344 | 8/48 | Kliever | 250—203 X |
| 3,002,097 | 9/61 | Nuut | 250—203 |
| 3,104,351 | 9/63 | Rosenberg | 250—209 X |

RALPH G. NILSON, *Primary Examiner.*